United States Patent [19]

Colgrove et al.

[11] 4,261,161
[45] Apr. 14, 1981

[54] AGRICULTURAL MACHINERY PROTECTIVE SYSTEM

[75] Inventors: David J. Colgrove, Winslow, England; Antoon S. P. Cools, Brugge-St. Kruis; Eric A. Mortier, Wingene, both of Belgium

[73] Assignee: Sperry Corporation, New Holland, Pa.

[21] Appl. No.: 95,127

[22] Filed: Nov. 16, 1979

[30] Foreign Application Priority Data

Nov. 24, 1978 [GB] United Kingdom ............... 45894/78

[51] Int. Cl.³ ........................................... A01D 75/18
[52] U.S. Cl. ............................... 56/10.2; 56/DIG. 15
[58] Field of Search ............ 56/10.2, DIG. 15, 11.2, 56/11.6

[56] References Cited

U.S. PATENT DOCUMENTS

| 3,242,657 | 3/1966 | Larsen et al. | 56/DIG. 15 |
|---|---|---|---|
| 3,590,564 | 7/1971 | Clifford | 56/10.2 |
| 3,959,953 | 6/1976 | Garrott | 56/DIG. 15 |
| 3,998,034 | 12/1976 | Rubin | 56/11.6 |
| 4,193,248 | 3/1980 | Gilleman | 56/DIG. 15 |
| 4,193,315 | 3/1980 | Noe | 56/11.6 |

Primary Examiner—Paul J. Hirsch
Attorney, Agent, or Firm—James R. Bell; Frank A. Seemar; Larry W. Miller

[57] ABSTRACT

The invention provides a crop harvesting machine comprising crop processing means, feeder means including feed rolls for feeding crop material to the processing means, drive means operable to drive the crop processing means, further drive means operable to drive the feeder means and detector means operable to detect foreign objects in the crop material in use handled by the machine before they reach the crop processing means, the further drive means comprising a drive reversing mechanism and a belt drive transmission with a belt drive engaging mechanism which is movable between an inoperative position and a drive-engaging position, and the detector means being operable upon detection of an undesirable object to initiate instantaneous arrest of the feed rolls and to move the belt drive engaging mechanism from its drive-engaging position to its inoperative position.

4 Claims, 7 Drawing Figures

AGRICULTURAL MACHINERY PROTECTIVE SYSTEM

BACKGROUND OF THE INVENTION

1. Field of the Invention

This invention relates to crop harvesting machines and is more particularly concerned with such machines which are fitted with apparatus for detecting the passage of foreign objects. More especially, the present invention is concerned with the provision of means for automatically stopping the drive to certain components of such a crop harvesting machine upon the detection of a foreign object.

2. Description of the Prior Art

A variety of objects such as stones, pieces of wood, plastics and metal may lie in the path of harvesting machines which cut or pick-up a crop and these are liable to cause damage to the crop processing means within the machines. Harvesting machines which are particularly subject to such damages are forage harvesters. The crop processing means in a forage harvester comprise a cutterhead and an associated shearbar. These crop processing means are of a precision character, have fine clearances, and are buried in the body of the machine, whereby access thereto is somewhat difficult. Such processing means normally also operate at a high speed and have a great inertia so that severe damage can be caused by metallic foreign objects before the components in question can be arrested. Pieces of wood are not generally a serious hazard. Stones are more so but generally splinter though causing chipped blades on the cutterhead. Plastics and non-ferrous metals are rare, and in any event relatively soft and hence not hazardous. Thus the main risk arises from ferrous metal objects which are both numerous and harmful. Such undesirable objects may be whole or broken components that have become detached from machines, tools left lying in a field or that have bounced out of moving machines, hitch pins, fencing stakes and scrap dumped by intruders. The high present-day level of mechanisation and the pressures on a diminishing labour force, have lead to an increased risk of ferrous scrap in all areas, augmented near towns by habits of disposal.

Whether or not they cause damage to a machine, metal objects passing through will find their way into the processed crop and may, therefore, ultimately injure livestock fed with it so that from all standpoints such objects need to be excluded.

Metal detectors in general, and metal detectors applied to forage harvesters, are already known in the art. However, in general, prior art devices for detecting the presence of metallic, ferrous, or other objects have one or more inherent disadvantages rendering them of little value in certain applications, especially in the reliable protection of expensive crop harvesting machinery from tramp metal. Such prior art devices often operate with high excitation frequencies and are susceptible to the presence of moisture, various types of vegetation, vibration, or the like. They, therefore, impose on the operator of a machine the serious burden of continuous monitoring and adjustment of the calibration of the detector. Even at relative low excitation frequencies such detectors are adversely affected to a significant extent by an over-extensive scanning area, thereby rendering them unusable for use where high accuracy, reliability and freedom from generation of false alarms is demanded. Additionally, prior art detection devices are located at positions which, for one reason or another, may fail adequately to detect the presence of incoming foreign objects. An example of a detection device located at a position within a crop harvesting machine which has been found less than satisfactory is illustrated in U.S. Pat. No. 3,757,501. This patent teaches the use of a detection device mounted in the floor plate of the header used with the harvester. This location permits undesirable objects which may be located on top of the incoming mat of crop material to go undetected. Further, this location creates the situation where each attachment, i.e. the header, would have to incorporate the detection device rather than it being standard equipment in the body of the forage harvester, thereby increasing the cost to the farmer.

It is also known to use blocking means in combination with metal detectors on forage harvesters, whereby on detection of an undesirable object the drive means for the feeder mechanism is immediately blocked. In this event a safety clutch in the drive line is rendered operative. Thus the movement of the crop feeder mechanism is stopped abruptly and hence also the layer of crop material with the undesirable object therein, which was progressing to the cutterhead, is stopped instantaneously. This of course prevents the undesirable object causing damage to the cutterhead and/or being mixed with the silage. This also enables the operator to reverse the feeder drive mechanism to remove the undesirable object. However, this abrupt blocking of the drive line of the feeder mechanism may be harmful to the drive means itself. Also, as long as the operator does not take appropriate action, the safety clutch continues slipping and prolonged slipping is, of course, undesirable. Furthermore, after the drive to the feeder mechanism has been stopped as a result of operation of the detection device it could be that, rather than reversing the drive to the feeder mechanism to remove the undesirable object, the operator re-engages the feeder drive in the normal working direction by mistake. This, of course, results in the undesirable object being fed to the cutterhead where it may cause damage, or, if it does not cause damage, it is chopped into small pieces and mixed with the silage.

In other known arrangements, the metal detector on a forage harvester has been combined with a feeder drive blocking device and an electric actuator which operates as soon as an undesirable object is detected. The electric actuator is coupled to a slip clutch mechanism in the drive line of the feeder mechanism and is operative upon detection of an undesirable object progressively to disengage the clutch mechanism. As long as the clutch mechanism is not entirely disengaged, it is slipping. Again, as was the case in the other above described prior art structure, the drive line and the clutch mechanism are subjected to heavy peak loads. Also, the safety clutch mechanism may continue to slip for a relatively long period of time and the operator may make a mistake by re-engaging the drive for the feeder mechanism in the normal operative direction without first having reversed that drive.

A prior art metal detection device used on a forage harvester is described in detail in British Patent Specification No. 2,013,072 A. The present invention aims at improving and simplifying this device and the associated drive stopping mechanism.

SUMMARY OF THE INVENTION

According to the present invention there is provided a crop harvesting machine comprising crop processing means, feeder means including feed rolls for feeding crop material to the processing means, drive means operable to drive the crop processing means, further drive means operable to drive the feeder means, and detector means operable to detect foreign objects in the crop material in use handled by the machine before they reach the crop processing means, the further drive means comprising a drive reversing mechanism and a belt drive transmission with a belt drive engaging mechanism which is movable between an inoperative position and a drive-engaging position, and the detector means being operable upon detection of an undesirable object to initiate instantaneous arrest of the feed rolls and to move the belt drive engaging mechanism from its drive-engaging position to its inoperative position.

Preferably the drive reversing mechanism is in the form of a reversible gearbox which can be shifted from a normal forward drive mode to a reverse drive mode via a neutral position in which the drive to the feed rolls is interrupted. Linkage means may be operatively associated with the reversible gearbox to enable the drive to be reversed manually from the operator's seat on a pulling tractor, in case of a pull type machine, or from the operator's seat on the harvester in case of a self-propelled machine.

BRIEF DESCRIPTION OF THE DRAWINGS

A forage harvester constructed in accordance with the present invention will now be described in greater detail, by way of example, with reference to the accompanying drawings, in which.

DETAILED DESCRIPTION OF A PREFERRED EMBODIMENT

Figure 1:
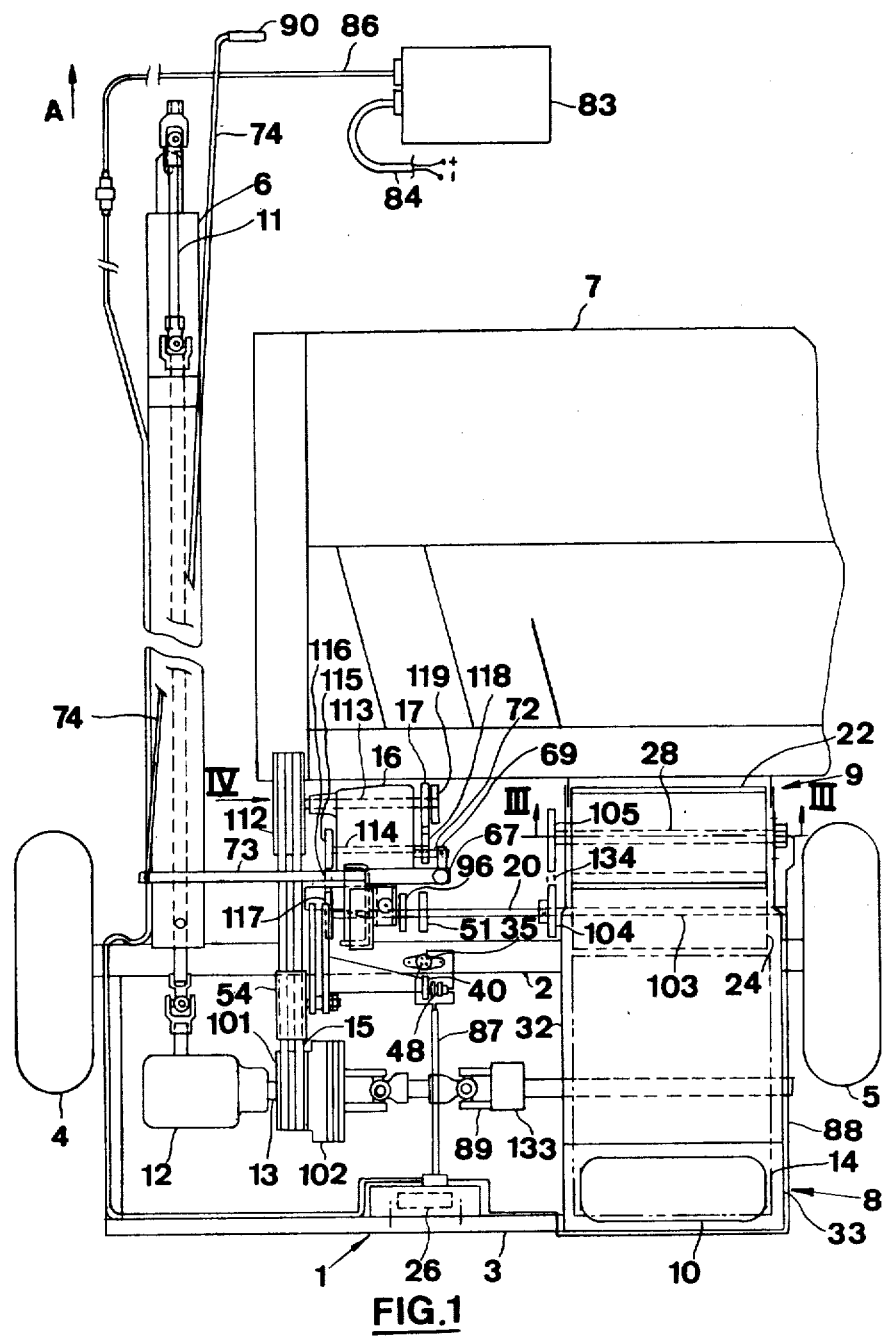
FIG. 1 is a schematic top view of the forage harvester, which is of the pull type.
Figure 2:
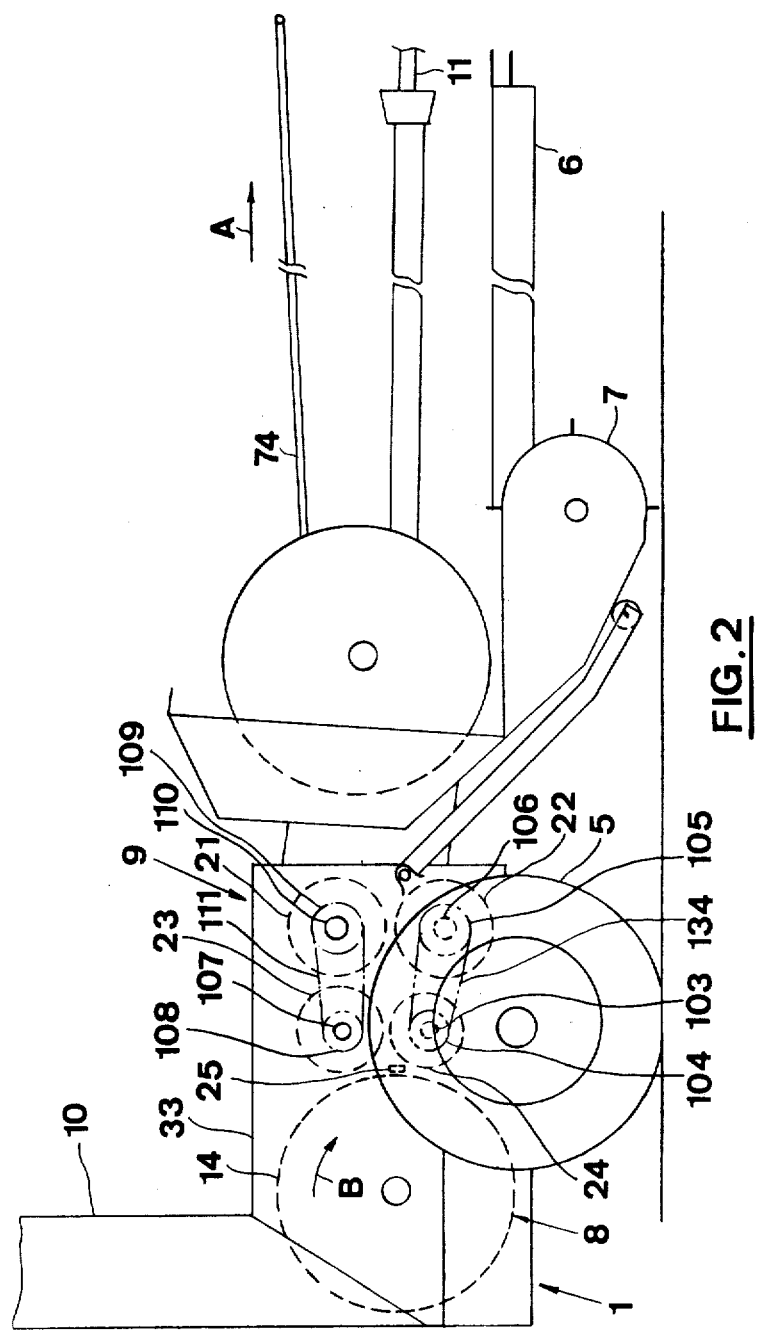
FIG. 2 is a schematic side view of the machine shown in FIG. 1.
Figure 3:
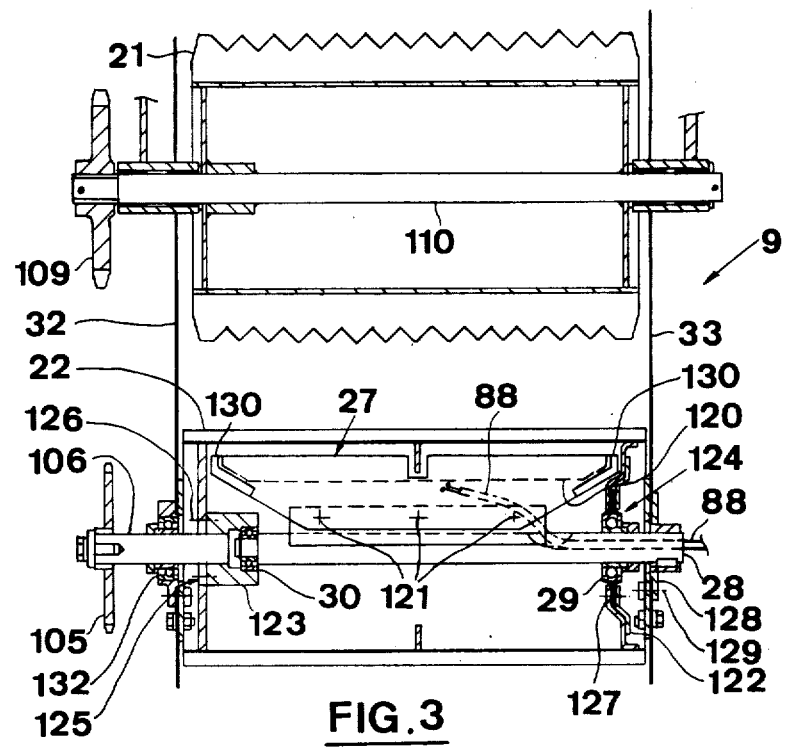
FIG. 3 is a sectional view taken along the lines III—III in FIG. 1.

The terms "forward", "rearward", "front", "rear", "right" and "left" used throughout the specification and claims are with respect to the direction of normal movement of the machine in operation, except when specified otherwise.

With reference to FIGS. 1-5, the pull-type forage harvester comprises a main frame or chassis 1 having transversely extending square-section tubular beams 2 and 3. Ground-engaging wheels 4 and 5 are rotatably mounted on brackets (not shown) at the respective ends of the beam 2. The harvester is drawn in the direction A by a square-section tubular hitch 6 pivotally connected to the left-hand end portion of the beam 2. A pick-up 7, or a row crop attachment (not shown), or a direct cut attachment (not shown) may be mounted on and forwardly of, the right-hand end of the frame 1 to deliver crop material to crop processing means 8 through crop feeder means 9. The processing means 8 comprise a rotatably mounted cutterhead 14 cooperable with a stationary shearbar 25 for processing the incoming crop material by chopping the crop into small pieces to form silage. The silage is conveyed to a spout 10 for discharge therethrough into a trailing wagon (not shown).

Power is delivered to the various operating mechanisms by a main drive shaft 11 which extends along and above the hitch 6. In operation the drive shaft 11 is coupled to the tractor PTO (not shown) at its forward end and is connected at its rear end to a gearbox 12 mounted adjacent the left-hand side of the harvester frame 1. An output shaft 13 extends at 90° relative to the main drive shaft 11 from the gearbox 12 in a transverse direction towards the processing means 8. Connected to the output shaft 13 is a pair of V-pulleys 101 and a safety clutch 102. The safety clutch 102 is drivingly coupled to the cutterhead 14 at the right-hand side of the machine via a universal joint shaft 89 and a free-wheeling clutch 133, and is arranged to drive the cutter head 14 in the direction B indicated in FIG. 2.

The crop feeder means 9 is generally conventional in design with a set of forward feed rolls 21 and 22 for compressing, feeding and directing the harvested crop to a pair of rear feed rolls 23 and 24, adjacent the shearbar 25. The rear feed rolls 23 and 24 feed the crop material into the cutterhead 14 over the shearbar 25 for processing (in this case, chopping). The chopped crop material (silage) is discharged rearwardly and upwardly through the discharge spout 10 by the movement imparted thereto by the cutterhead 14. The lower rear feed roll 24 is keyed on a shaft 103 coupled to an intermediate drive shaft 20 forming part of the drive for the feeder means 9. A sprocket 104 is secured to the shaft 103 at the left-hand side of the associated feed roll 24 and is aligned with another sprocket 105 on the shaft 106 supporting the lower and forward feed roll 22. A chain 134 is drivingly wrapped around the sprockets 104 and 105 so that the lower feed rolls 22 and 24 always are driven in unison and in the same direction. The shafts 103 and 106 are rotatably mounted at fixed locations in side walls 32 and 33 of the forage harvester.

The upper rear feed roll 23 is keyed on a shaft 107 which supports at its left-hand end a sprocket 108 aligned with a sprocket 109 on a shaft 110 supporting the upper and forward feed roll 21. A chain 111 is drivingly wrapped around the sprockets 108 and 109 to drive both the upper feed rolls 21 and 23 in unison and in the same direction. The upper feed rolls 21 and 23, the shafts 107 and 110, the sprockets 108 and 109 and the chain 111 have not been shown in FIG. 1 for the sake of clarity.

The entire feeder means 9 comprising the feed rollers 21; 22, 23 and 24 is driven from the 90° gearbox 12 via V-belts 15 wrapped around the V-pulleys 101 on the output shaft 13 and another set of pulleys 112 on an input shaft 113 of a reversible and reduction gearbox 16. An output shaft 114 of the gearbox 16 supports a sprocket 115 for transmitting drive to the intermediate shaft 20 via a chain 116 and a further sprocket 117, the sprocket 117 being keyed on the intermediate shaft 20. The gearbox 16 comprises a set of gears and a shiftable double jaw clutch which are all of the conventional type and which therefore will neither be shown nor described in any further detail.

The intermediate shaft 20 supports a gear 96 which is arranged to mesh with a further gear on a further intermediate shaft which itself is rotatably mounted on the harvester frame 1 and which is coupled to the upper and rear feed roll shaft 107 via a universal joint shaft. The further gear, further intermediate shaft and the universal joint shaft are of the conventional type and are not shown in the drawings for the sake of clarity. Thus, the upper feed rolls 21 and 23 are always driven in the direction opposite to the direction of drive of the feed rolls 22 and 24. The upper feed rolls 21 and 23 are floatingly mounted above the lower feed rolls 22 and 24 in a manner which is generally known in the art. The forward feed rolls 21 and 22 are made of stainless steel for a reason to be explained hereinafter.

The output shaft 114 of the gearbox 16 supports at its end opposite to the sprocket 115 a gear 118 arranged to drive a further gear 17 which is freely rotatably mounted on the input shaft 113 and which is drivingly coupled to a sprocket 119 from where the various header attachments (direct cut, row crop, pick-up) can be driven in a manner which is not shown but which is generally conventional.

Ferrous material detector means are provided comprising signal generating means 26 and magnetic coil means 27. The magnetic coil means 27 are adapted to interrupt the constant signal generating means 26 whenever ferrous tramp metal moves into the vicinity of the feed rolls 21 and 22. The constant signal generating means is similar to the one described and shown in U.S. Pat. No. 3,959,953 and for this reason will not be described in further detail herebelow.

The constant signal generating means 26 is mounted on the rear beam 3 of the frame 1 and in operation provides a constant, non-interrupted signal during the normal operation of the harvester, i.e. when no tramp metal is moving in the vicinity of the feed rolls 21 and 22. Electronically interconnected with the constant signal generating means 26 is the magnetic coil means 27 stationary mounted within the lower front feed roll 22 of the harvester. The magnetic coil means 27 of the present invention is similar in construction to that also described in U.S. Pat. No. 3,959,953.

The magnetic coil means 27 consists of a bar magnet 120 (FIG. 3) around which is wrapped coils of wire (not shown). The magnetic coil means 27 is rigidly mounted on the stationary shaft 28 by bolts 121. Prior to insertion into the feed roll 22, the shaft 28 is fitted with ball bearings 30. A collar 123 is then placed over the bearings 30 and inserted through an opening 124. The collar 123 contains a splined stub shaft 106 which extends through an opening 125 in the left-hand side of the feed roll 22. After the shaft 28 has been inserted through the opening 124, the collar 123 is secured to the left-hand side wall of the feed roll 22 by bolts 126. The stub shaft 106 supports at its outer end the aforementioned sprocket 105 and is rotatably supported on the side wall 32 via ball bearings 132.

The right-hand end of the feed roll 22 is fitted with ball bearings 29 and a flange 127. A steel shield 122 is placed on, and secured to, the outside of the flange 127 and the feed roller 22. Finally, a mounting plate 128 is placed on the shaft 28 and secured to the side wall 33 by bolts 129. The mounting plate 128 contains a collar adapted to be inserted with a key to secure the shaft 28 in a fixed position. The mounting arrangement just described enables the feed roll 22 to rotate without involving rotation of shaft 28, thereby maintaining the magnetic coil package 27 in a stationary position within the feed roll 22.

In order to prevent the magnetic-coil package 27 from detecting any ferrous components of the harvester, shields 130 are placed on either side of the magnet 120. Also, to prevent detection of the feed rolls 21 and 22 themselves, they are constructed, as already mentioned above, of non-magnetic material, i.e. stainless steel.

The detector means further comprises a solenoid 35 the body of which is rigidly mounted on the main frame 1 of the harvester via a support 34. A control box 83 is also provided and is arranged to be mounted in the pulling tractor (not shown) and can be coupled to the electric power source of the tractor at 84. The control box 83 is detachably coupled via cables 86 to the constant signal generating means 26, solenoid 35 is coupled into the circuit through leads 87, and magnetic-coil means 27 through leads 88. An electric switch 48 of the normally open type is inserted in the electric circuit between the constant signal generating means 26 and the solenoid 35. A relay switch is provided inside the control box 83 to cut off the power from the battery to the solenoid 35 upon the detection of ferrous material. The solenoid also has a built-in relay to switch from "pull" to "hold" when the solenoid plunger is retracted. The pull current may be of the order of 20 Amps. whilst the hold current may be of the order of 0.5 Amps.

Figure 4:
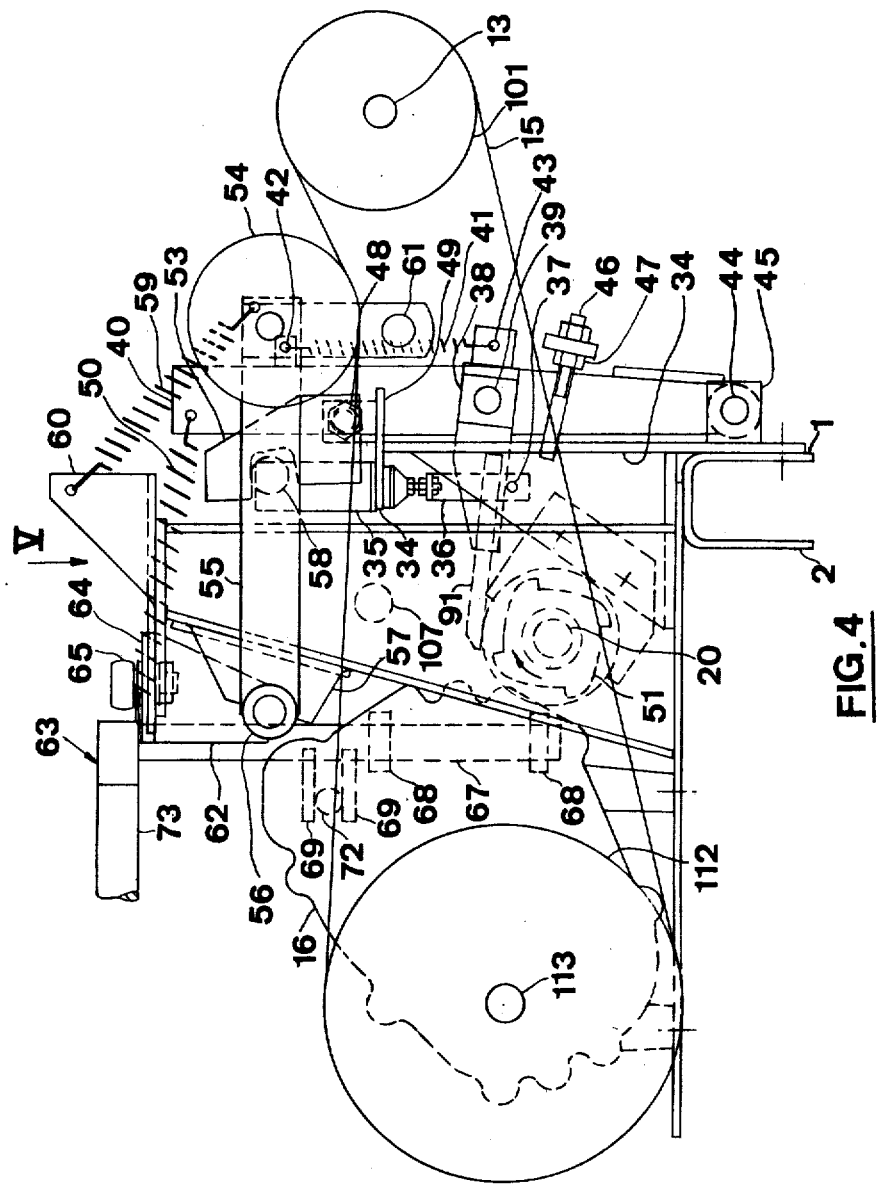
FIG. 4 is a side view of a portion of the machine shown in FIG. 1 on a larger scale and seen in the direction of arrow IV of FIG. 1, but with certain components removed for clarity.
Figure 5:
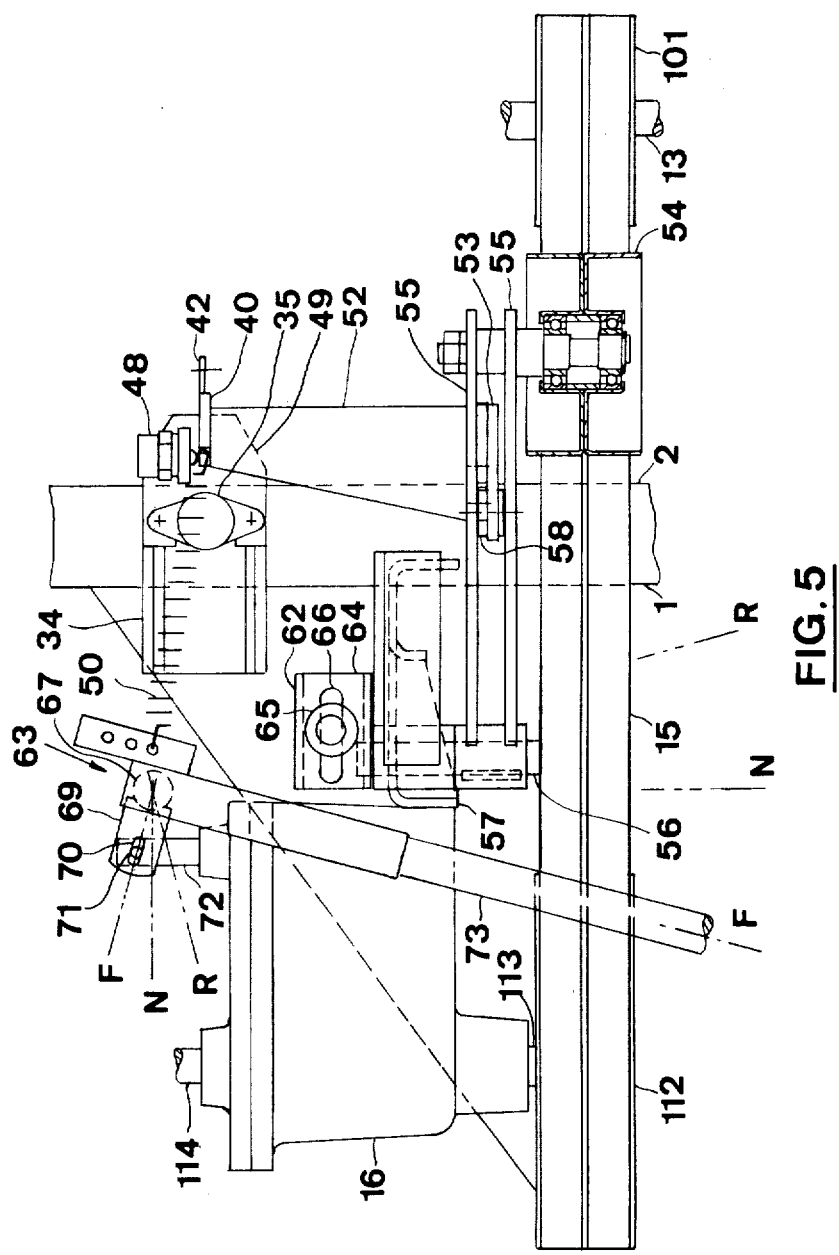
FIG. 5 is a top view taken in the direction of arrow V of FIG. 4, but again with certain components removed for clarity.

The mechanism to interrupt the operation of the feed roll drive system is illustrated in FIGS. 4 and 5. Linkage 36 extends downwardly from the body of the solenoid 35 and normally supports by a pin 37 a rock arm 38 which itself is pivotably mounted at 39 on a generally upright rock lever 40. Spring means 41 extending between a fixation point 42 on the rock lever 40 and a fixation point 43 on the rock arm 38 at a location opposite to the solenoid 35 relative to the pivot 39 urge the rock arm 38 in a downward direction, opposite to the normally holding force of the solenoid 35. The rock lever 40 is pivotably mounted at its lower end via a pivot 44 on a member 45 which is rigidly secured to the harvester frame 1. The rock lever 40 is movable between a first stop formed by the member 34 and a further stop 46 secured thereto. The stop 46 comprises shock absorbing means 47.

The electric switch 48 is secured to a support 49 on the member 34 and is arranged to be closed by the rock lever 40 when in the position shown in FIG. 4 and to open when the lever 40 is moved to the right in FIG. 4. Spring means 50 extend between the lever 40 and a fixation point on the frame 1 and urge the lever 40 towards the left as seen in FIG. 4.

Connected to the rock lever 40 is a rigid arm 52 extending transversely of the machine on the left-hand thereof. The arm 52 supports at its left-hand end a hook 53, the function of which will be described hereinafter.

A drive-engaging idler pulley 54 is rotatably mounted on a pair of spaced apart arms 55 which are pivotably mounted at one end via a pivot shaft 56 on a member 57 of the frame 1. The arms 55 extend at the opposite sides of the hook 53 and support a roller 58 which is mounted therebetween. The hook 53 is operable to engage the roller to holding the idler pulley 54 in the drive-engaging position. Spring means 59 between the pivot arms 55 and a fixed member 60 of the frame 1 tend to lift the idler away from the drive belts 15. A belt lifting hook 61 is attached to the pivot arms 55 and lifts the belts 15 as the drive is disengaged.

Secured to the pivot shaft 56 is a further arm 62 which projects generally upwardly and extends in the vicinity of a reversing control mechanism 63 to be described. At this location the further arm 62 comprises a bent portion 64 which extends generally horizontally. A roller 65 is supported on the portion 64 and is engageable by a component of the reversing control mechanism 63. The roller 65 is adjustably secured in an elongated aperture 66 in the horizontal portion 64 and comprises a rounded outer surface as can best be seen in FIG. 4.

The reversing control mechanism 63 comprises a generally upright pivot shaft 67 which is pivotally mounted on the reversible gearbox 16 at 68 and which comprises a pair of arms 69 pivotably coupled via an elongate aperture 70 and a pin 71 passing therethrough to a shift rod 72 of the gearbox 16. The shift rod 72 is arranged in the conventional manner to shift gears within the gearbox 16 between three positions. A first position is the forward drive position (F) in which the feed rollers are driven in a direction feeding crop material rearwardly therebetween and towards the cutter head 14. In another position (neutral:N), the drive means for the feed rollers are disengaged. In the third position, which is the reverse drive (R) position, the feed rolls are driven in a reversed direction so as to discharge material from therebetween forwardly of the machine.

The pivot shaft 67 further rigidly supports at its upper end an arm 73 which extends generally transversely of the machine and toward the left-hand side thereof where it is pivotably coupled to a push-pull rod 74 (FIG. 1) which extends in a forward direction above the hitch 6 towards the tractor (not shown). The arm 73 is the component described above which is engageable with the roller 65 on the drive engaging mechanism comprising the idler pulley 54.

A ratchet 51 is attached to the intermediate shaft 20 from which all the feed rolls 21, 22, 23 and 24 are driven. During the normal operation of the forage harvester, the solenoid 35 receives a constant signal from the first portion 26 of the signal generating means and is activated, thereby maintaining the rock arm 38 in the retracted and raised position. This causes the arm 38 to be removed from engagement with the teeth of the ratchet 51.

OPERATION OF THE PREFERRED EMBODIMENT

In operation, the machine is pulled in the field behind a tractor and power is supplied thereto via the tractor PTO which is coupled to the power input shaft 11, comprising universal joints as is generally known in the art. The idler pulley 54 is in its lowered position, thus tensioning the V-belts 15 around the pulleys 101 and 112 and is held in this position by the hook 53 engaging the roller 58 on the pivot arms 55. The gearbox 16 is in the (F) forward drive position and the metal detector means is energised, whereby the rock arm 38 is held out of engagement with the ratchet 51.

The pick-up means 7, or other attachment such as a row crop attachment or a direct cut attachment, is lowered to the operative position and driven to lift crop material from the ground and to convey it to the feed rolls 21, 22, 23 and 24 rearwardly thereof. The feed rolls 21, 22, and 23, 24 are driven to take crop material received from the pick-up attachment 7 therebetween and pass it in a rearward direction towards the cutterhead 14. The cutterhead 14 is driven through the shaft 13 on the angle gearbox 12 and the universal joint shaft 89 and cooperates with the shearbar 25 to chop into small pieces the incoming crop from the feed rolls to form silage. The silage so formed is discharged through the upwardly and rearwardly extending spout 10 by the inertia imparted thereto by the cutterhead 14. The silage is collected in a forage wagon trailed behind or alongside the harvester whereafter it is transported to the required storage location.

If a blockage occurs in the attachment 7 or in the feed rollers 21 to 24, the safety clutch 102 starts slipping. The operator then immediately stops the forward movement of the tractor, and hence the harvester attached thereto, and to unplug the machine he reverses the drive of the feed rolls 21 to 24 and the header attachment. Thus crop material is expelled from the machine in a forward direction and the blockage cleared. This drive reversal is accomplished by pushing the handle 90 of the push-pull rod 74 as far backwards as possible. In this way the arm 73 is swung in an anti-clockwise direction around the pivot shaft axis 67 and the shift rod 72 moves into the gearbox 16 to place the latter in the (R) reverse mode. During this swinging movement of the arm 73, the latter will not engage the roller 65 because in this operating condition it is positioned in its rearwardmost position.

When the blockage has been cleared by expelling the offending wad of crop material in a forward direction, the normal drive position (F) can again be re-established by pulling on the handle 90 which first puts the gearbox in the neutral (N) position and then in the forward (F) drive mode. It should be noted that, as is conventional, the cutterhead 14 has not been reversed nor stopped during the reversal of the feedrolls 21 to 24 and the header attachment 7. This is because the cutterhead 14 is driven at a very high speed and is relatively heavy which means it has an extremely high inertia. Thus to stop and reverse the cutterhead drive instantaneously would inevitably damage the machine substantially. Moreover reversing the cutterhead is normally not necessary as a blockage usually occurs in the components located forwardly of the cutterhead.

Thus, it can be seen that the detector means for ferrous material and the associated drive interruption means do not interfere with the conventional drive reversal process for clearing blockages in the attachment and the feeder means.

Turning now to the operation of the detector means and the associated drive interruption means, it is necessary to describe first the operation when no tramp metal is fed to the cutterhead. During the normal operation of the harvester, i.e. when no tramp metal is in the vicinity of the feed rolls 21 and 22, a constant signal is generated by the constant signal generating means 26. This signal is conveyed to the relay switch in the control box 83 which in turn energises the solenoid 35. The built-in relay switch in the solenoid 35 is in the "hold" position and the solenoid plunger is in the retracted position. Thus the entire drive system interruption means is in the retracted position with respect to the ratchet 51. Accordingly, the intermediate shaft 20 can be rotated in the normal manner to drive the feed rolls 21 to 24 and the header attachment 7 in the forward direction, i.e. in the direction for feeding crop material to the cutterhead 14.

When a ferrous object passes in the crop material to the forwardmost feed rolls 21 and 22 and moves through the flux field generated by the magnet 120, a signal is generated in the coil means 27 and relayed to the constant signal generating means 26. This signal, when received, interrupts the constant signal, thereby releasing the relay switch in the control box 83 to cut off the power from the battery to the solenoid 35. On de-energisation of the solenoid 35, the plunger thereof and the member 36 drop in a downward direction as seen in FIG. 4. Gravity and the spring 41 urge the rock arm 38 with the pawl 91 thereon downwardly so that the pawl 91 engages one of the teeth of the ratchet 51. Thus the drive to the feed rollers 21 to 24 is stopped or blocked instantaneously. At the same time, the drive transmission to the feed rolls is interrupted in the manner to be described. However, it is appropriate to note here that in known devices, the above described instantaneous stopping or blocking of the feed rolls and header attachment drive results in the operation of an overrunning or safety clutch. As long as the operator takes no action, this clutch remains operative.

According to the present invention, the drive train to the feeder means 9 is automatically disengaged, as will now be described. When the pawl 91 engages a tooth of the ratchet 51, the latter kicks the arm 38 to the right as seen in FIG. 4. This causes the rock lever 40 to pivot to the right around pivot 44 until it abuts against the shock absorber 47 of the stop means 46. This pivotal movement of the rock lever 40 results in the hook 53 instantaneously releasing the roller 58 on the arms 55, whereby the arms 55 with the idler pulley 54 thereon swing in an upward direction as a result of the action of the spring 59. As a result, the V-belts 15 are no longer tensioned and the drive train to the feed rolls is interrupted even though the gearbox 16 is still in the forward (F) drive mode.

The signal relayed to the signal generating means 26 is merely induced by a change in the flux field of the magnet 120 caused by the presence of the foreign object. As soon as the feed rolls 21 to 24 are arrested, the foreign object ceases movement relative to the magnet 120 and, therefore, if no precautions were taken, the solenoid 35 would soon be re-energised and would tend to lift the rock arm 38. However, occasionally this rock arm 38 may be firmly locked due to the contact pressure between the pawl 91 and the ratchet 51. Under these circumstances the solenoid 35 cannot lift the rock arm 38 and the pawl 91 but the relay in the solenoid remains in the "pull" position and a high current continues to pass through the solenoid which could damage the latter or any circuit breaker associated therewith. If a circuit breaker is provided, it would cycle as long as the solenoid 35 cannot lift the rock arm 38. To avoid this, the electric switch 48 has been provided in the circuit to the solenoid 35. This switch 48 is arranged such that it is opened when the rock lever 40 is pivoted to the extreme right position as seen in FIG. 4. Thus, as long as the rock arm 38 is clamped by the ratchet 51, the solenoid cannot be re-energised and no damage can occur thereto, due to overheating, or to an associated circuit breaker.

As soon as the foreign object has been detected, the movement of the header attachment 7 and the feed rolls 21 to 24 stopped and the drive train therefor interrupted, the only actions the operator has to perform are to stop the forward movement of the tractor, and hence the machine, and to remove the foreign object. Removing the foreign object is accomplished by reversing the drive to the feed rolls 21 to 24 and the attachment 7 and then re-engaging the forward drive (F).

To reverse the drive, the operator pushes the handle 90 rearwardly thus causing the arm 73 to swing from the (F) forward position to the (R) reverse position through the (N) neutral position, whereby the drive transmission in the gearbox 16 is reversed. Simultaneously, the arm 73 engages the roller 65 which has assumed its forwardmost position as a result of the upward swinging movement of the arms 55 with the pulley 54 thereon. The arm 73 pushes the roller 65 in a rearward direction during its movement from the (F) to the (R) position. As a result, the pulley 54 is caused to move in a clockwise direction around the pivot 57 so as to re-engage the belt drive 101, 15 and 112. This belt drive remains engaged as long as the arm 73 is held in the reverse (R) position, whereby, since at the same moment the drive direction in the gearbox 16 has been reversed, the attachment 7 and the feed rolls 21 to 24 are driven in the direction opposite to the normal forward drive direction. As a result, the foreign object is expelled in a forward direction from the machine and can be retrieved by the operator.

As the attachment 7 and the feed rolls 21 to 24, and also the intermediate shaft 20, are driven in the reverse direction, the pawl 91 slides over the ratchet 51 which is rotated in the anti-clockwise direction and hence the pawl/ratchet contact pressure is relieved. As a result, the spring 50 causes the rock lever 40 to swing back to its initial position as shown in FIG. 4. This movement re-closes the switch 48, whereby the solenoid 35 is re-energised and thus the pawl 91 and rock arm 38 are lifted, so that the detector means is in the normal working condition.

As at the moment the rock lever 40 swings to its initial normal or rest position, the pivot arms 55 with the idler pulley 54 thereon are in their lowermost drive-engaging position, the hook 53 is swung over the roller 58 on the arms 55 so that the pivot arms 55 are latched in their drive-engaging position. Thus the belt drive 101 and 112 will remain engaged even when the arm 73 is swung to the front of the machine, i.e. to the (N) neutral and subsequently to the (F) forward position.

When the foreign object has been removed, the machine is thus immediately in condition for continuing normal operation. Indeed, the drive train is automatically re-established whilst removing the object and the forward drive mode is obtained merely by pulling the handle 90 to its forwardmost position.

From the foregoing it will be clear that any time a foreign object has been detected, it is impossible for the operator to re-engage the drive in the forward direction without first having reversed the drive direction and thus expelled the object from the machine. This is thus an important safety aspect; should the operator, by mistake, first pull on the handle 90 in an attempt to re-engage the drive in the forward direction, this will have no effect and no damage can be caused by the detected foreign object.

Also, the re-establishment of the belt drive is a very simple operation and does not require any special action from the operator as it is accomplished automatically whilst reversing the drive direction to remove a detected foreign object.

During normal operation, and when no foreign objects are detected, different methods can be used to stop the machine or driven components thereof. A first method is to stop the PTO, whereby the drive to the entire machine is interrupted with, however, the belt drive transmission still engaged and the gearbox 16 in the forward (F) drive mode. The machine can be re-started merely by re-engaging the PTO drive. However, this is not a preferred method as all components of the machine are started at the same time, whereby a peak power requirement is created. Preferably, the gearbox 16 is shifted to the neutral (N) position so that when re-engaging the PTO drive, only the cutterhead 14 is driven instantaneously. The drive to the attachment 7 and the feed rolls 21 to 24 can be engaged subsequently by shifting the gearbox 16 to the (F) forward position.

During operation in the field, the attachment and feed roll drives may be stopped instantaneously by shifting the gearbox 16 to the (N) neutral position. In this condition, the cutterhead 14 continues to be driven so that all chopped crop material in the machine at that time is discharged. Also the belt drive transmission remains engaged.

If for some reason, for example at the end of a day's work, the operator wishes to disengage the belt drive, he merely switches off the metal detector whilst the machine is still running. This results in the pawl 91 falling into engagement with the ratchet 51, which in turn causes the rock lever 40 to swing rearwardly. This also results in the hook 53 releasing the arms 55, whereby the idler pulley 54 is lifted away from the drive belt 15. Thereafter, the gearbox 16 may or may not (at will) be shifted to neutral (N). In any event, in this condition, the belt drive will have to be re-established before the machine can be rendered operative again and this involves shifting the gearbox 16 to reverse (R) and then to forward (F) drive, through neutral (N), as already described.

When the attachment 7 and/or feed rolls 21 to 24 become blocked with crop material, it may happen that, as a result of the high contact pressure between the meshing gears in the gearbox 16, shifting the gearbox 16 to reverse (R) is impossible. In this condition, the operator should stop the PTO drive and subsequently manually cause the rocking lever 40 to swing towards the rear of the machine, whereby the belt drive will be disengaged and consequently the contact pressure between the meshing gear teeth in the gearbox is released so as to allow easy gear shifting.

MODIFICATIONS

Figure 6:
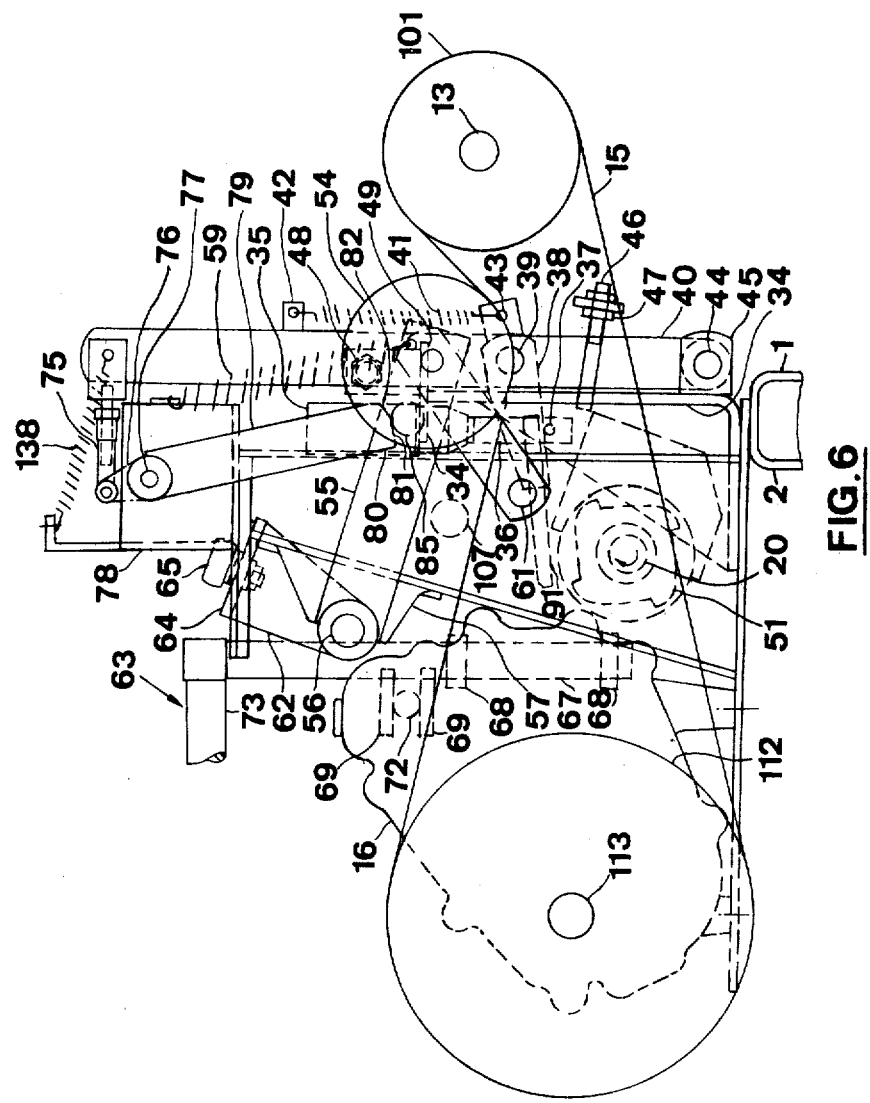
FIGS. 6 and 7 are views similar to FIGS. 4 and 5, respectively, but illustrating another embodiment of the invention and with the components in different positions.
Figure 7:
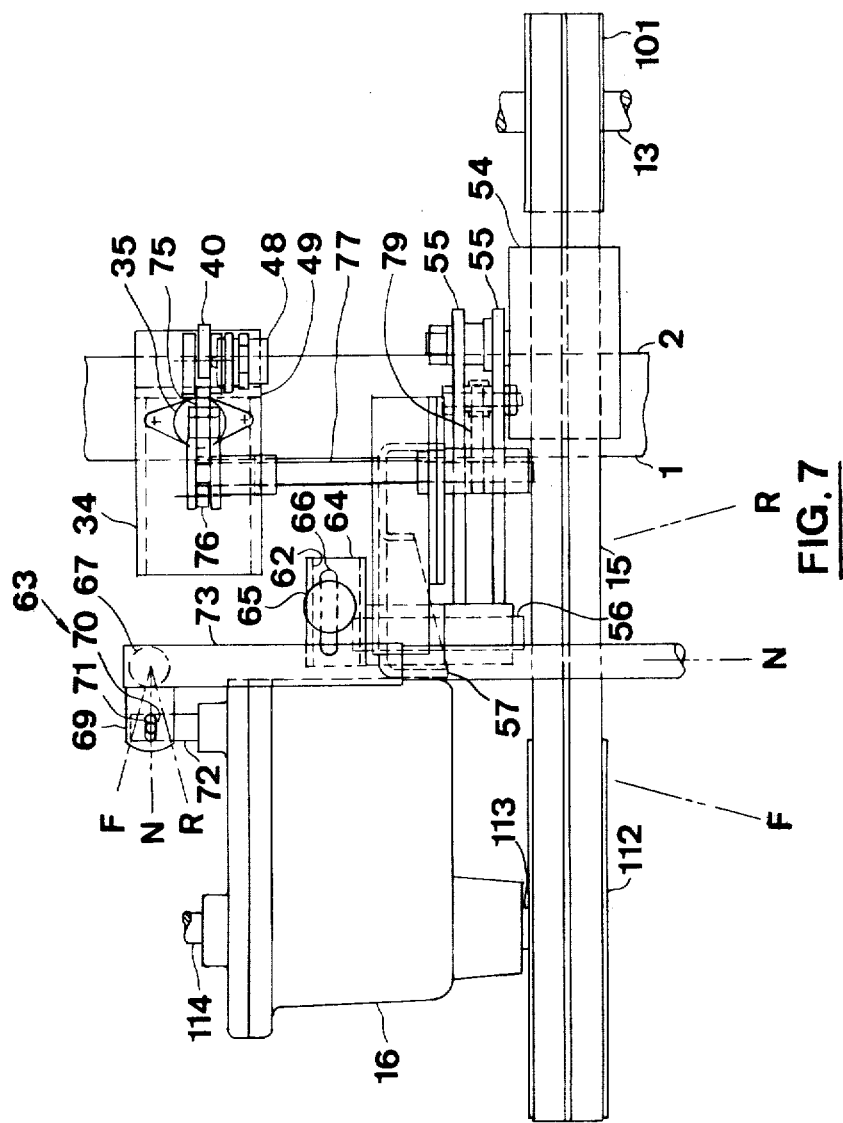

With reference to FIGS. 6 and 7, another embodiment of the present invention is illustrated and components similar to those of the embodiment of FIGS. 1 to 4 have been given like reference numerals. The drive mechanism again comprises the belt drive transmission 101, 15 and 112 as well as the reversible gearbox 16 with the reversing control mechanism 63. The intermediate shaft 20 also comprises the ratchet 51 which, in cooperation with the pawl 91, can kick the rock lever 40 towards the rear of the machine. In normal working conditions the pawl 91 and the rock arm 38 are held in a retracted position by the solenoid 35. So far, the arrangement according to FIGS. 6 and 7 is identical to the arrangement of FIGS. 4 and 5.

The rock lever 40 which, as in the first embodiment, is pivotable around the pivot 44 on the support 45 and which can move between the stops 34 and 46, is coupled at its upper end to a link 75 which itself is pivotably coupled at its other end to the arm 76 which is secured on a transverse shaft 77. The transverse shaft 77 is rotatably mounted on a fixed member 78 of the chassis and rigidly supports a further arm 79 having one end 80 of special shape. One section 81 of the end 80 is arranged generally perpendicular to the longitudinal axis of the further arm 79 and a further section 82 is inclined relative thereto. The end 80 is positioned generally between the arms 55 upon which the idler pulley 54 is rotatably mounted and is also adapted to cooperate with a roller 85 mounted between the arms 55 to hold the latter and the pulley 54 in a lowered position. The link 75 is made adjustable in length to enable accurate setting of the arm 79 relative to the roller 85. Spring means 138 urge the rock lever 40 against the forwardmost stop 34 and thus tend to swing the further arm 79 in a counterclockwise direction around its pivot axis 77.

When, in operation, a ferrous object is delivered to the forwardmost feed rolls 21 and 22 and power to the solenoid 35 de-energised in the manner already described in connection with the first embodiment, the pawl 91 drops onto the ratchet 51 under the influence of gravity and the force of the spring 41. As in the first embodiment, this results in an instantaneous blocking or arrest of the feed rolls 21 to 24 and the attachment 7. This also results in the rock arm 40 swinging to the rear of the machine around its pivot 44 until it reaches the stop 46, whereby the pivot shaft 77, with the arms 76 and 79 thereon, is pivoted in a clockwise direction. Thus the end 80 of the arm 79 releases the roller 85 and the arms 55, with the pulley 54 thereon, swing upwardly under the influence of the tension spring 59. Hence the belt drive transmission 101, 15 and 112 is disengaged at the same moment as that the feed rolls 21 to 24 and the attachment 7 are arrested.

Also as with the first embodiment, it is not possible to re-engage the drive in the forward direction without first having reversed the drive to feed rolls 21 to 24 and to the attachment 7. This is accomplished by the arrangement whereby the belt drive transmission can be re-engaged only whilst reversing the drive direction to the feed rolls 21 to 24 and attachment 7.

It will be seen from the two illustrated embodiments that a very satisfactory harvesting machine is provided by the invention. Upon detection of a foreign object the motion of the feeder mechanism is instantaneously arrested and the drive train to the feeder mechanism simultaneously, or previously, interrupted so that no damage is caused by the abrupt stopping of the feed rolls which in turn prevents damage by removing the possibility of the detected object reaching the processing means. Following detection of a foreign object, the time taken to arrest the feed rolls 21 to 24 is about 1/20 second.

What we claim is:

1. A harvesting machine comprising crop processing means, feeder means including feed rolls for feeding crop material into the processing means, drive means operable to drive the crop processing means, further drive means operable to drive the feeder means, and detector means operable to detect foreign objects in the crop material in use handled by the machine before they reach the crop processing means, the further drive means comprising a drive reversing mechanism and a belt drive transmission with a belt drive engaging mechanism which is movable between an inoperative position and a drive engaging position, and the detector means being operable upon detection of an undesirable object to initiate instantaneous arrest of the feed rolls and to move the belt drive engaging mechanism from its drive engaging position to its inoperative position;

linkage means coupled to the reversing mechanism for enabling the further drive to be reversed manually, the linkage means including a shift rod on the reversible gearbox and a rock arm operatively coupled thereto;

a tension pulley in the belt drive engaging mechanism, said pulley being rotatably mounted on a first arm of a pivot lever, the pivot lever being pivotally mounted on a chassis of the machine and being movable between an inoperative position and a belt drive engaging position;

the pivot lever comprises a further arm extending to the vicinity of the rock arm of the linkage means and engageable therewith when the belt drive engaging mechanism is in its inoperative position, the arrangement being such that, by shifting the drive reversing mechanism from its normal forward drive position to its reverse drive position, the belt drive engaging mechanism is shifted simultaneously from its inoperative position to its belt drive engaging position.

2. A harvesting machine according to claim 1, wherein the further arm of the pivot lever rotatably supports a roller which is adapted to be engaged by the rock arm of the linkage means.

3. A harvesting machine according to claim 2, wherein the roller is adjustably mounted on the further arm of the pivot lever relative to the rock arm of the linkage means.

4. A harvesting machine comprising crop processing means, feeder means including feed rolls for feeding crop material to the processing means, drive means operable to drive the crop processing means, further drive means operable to drive the feeder drive means, and detector means operable to detect foreign objects in the crop material in use handled by the machine before they reach the processing means, the further drive means comprising a drive reversing mechanism and a belt drive transmission mechanism with a belt drive engaging mechanism which is movable between an inoperative position and a drive-engaging position, and the harvesting machine further comprising holding means operable to hold the belt drive engaging mechanism in its drive engaging position, drive blocking means associated with the further drive means, and linkage means between the drive blocking means, the holding means and the detector means, the arrangement being such that upon the detector means detecting a foreign object, the blocking means instantaneously arrest the feed rolls and the linkage means simultaneously cause the holding means to release the belt drive engaging mechanism so as to interrupt the drive train to the feeder means; and drive reversing control means coupled to the drive reversing mechanism and operatively associated with the belt drive engaging mechanism in a manner so that, when the belt drive engaging mechanism is in its inoperative position, actuation of the reversing control means for reversing the drive direction of the drive train to the feeder means, also causes the belt drive engaging mechanism to move towards its drive engaging position.

* * * * *